UNITED STATES PATENT OFFICE.

WILLIAM COALE, OF WARREN, OHIO.

WALL-PLASTER.

SPECIFICATION forming part of Letters Patent No. 635,996, dated October 31, 1899.

Application filed June 26, 1899. Serial No. 721,917. (No specimens.)

*To all whom it may concern:*

Be it known that I, WILLIAM COALE, a citizen of the United States, residing at Warren, in the county of Trumbull and State of Ohio, have invented and produced a new and useful Composition of Matter to be Used as a Wall-Plaster, of which the following is a specification.

My composition consists of the ingredients, combined in the proportions and having each its office and equivalent, substantially as hereinafter described. The ingredients and their proportions are substantially as follows, assuming that all the measures are by avoirdupois weight for a ton or two thousand pounds of the composition: calcined gypsum or plaster, about one-half or fifty per cent. in weight; hydraulic cement, about one-fourth or twenty-five per cent. in weight; clay, about one-seventh in weight; lime, about one-twelfth in weight; chemical stucco-retarder, about seven pounds; fiber, about one-twentieth in weight, assuming that it is in a perfectly dry state and that wood fiber is used. Other fibers should be according to weight and quality.

The above proportions are necessarily approximate, because they may be varied both ways, more or less, and give very satisfactory results. For example, the gypsum might vary from one-third to two-thirds of the bulk or quantity, by weight, according to quickness desired in setting. The clay gives softness or plasticity, and such proportion thereof may be used according as this particular quality may be desired. The lime also may be varied from one-twentieth to one-fifth in proportion as compared to the other materials used and promotes flow and smoothness under the trowel, as well as hardness and durableness at last. A like variation may be practiced in the use of the fiber, which may be a vegetable or other product; but suitably-prepared wood fiber serves a very good purpose and forms the basis of my present estimates.

In lieu of the chemical stucco-retarder I may use any equivalent retarding material, of which there are several, especially such as possess or contain suitable acids or acid compounds, and some kinds of clay answer the purpose measurably well, the purpose of this ingredient being to hinder or delay the setting of the plaster on the wall, and thus avoid cracking. The "stucco-retarder," which is a commercial article known by this name and an earth product obtained in the State of Iowa, is a powerful retarding agent, so that a relatively small quantity thereof serves the purpose; but its office, though an important one in a sense, is brief, as it is only intended to promote favorable action of the plaster after being placed on the wall. Once on and set, the retarder has probably little or no further value of consequence in the composition.

A quick setting and drying cement ingredient is used as a permanent hardening substance to supplement the quick setting and hardening, but otherwise brittle, calcined plaster. As an equivalent to calcined plaster any quick-setting plaster or cement made from gypsum or kindred rock may be used, and as an equivalent of hydraulic cement I suggest any product of cement-rock, marl, calcined clay, or prepared furnace-slag, such as is classed as "Portland cement," "water-lime," or "natural cement."

Clay is used chiefly to give the composition a soft, plastic consistency, and in this function it is materially assisted by the lime, the two ingredients making the composition when wet up and ready for use a plastic, smooth-working plaster, which works easily under the tools used to apply it and to straighten and finish the walls and ceilings.

Water-slaked, ground, and recarbonated lime is used in preference to quicklime or slaked lime, because it helps to prevent the danger of shrinking or cracking in the wall otherwise liable to occur and possesses a greater inherent strength and is not affected by surroundings, as quicklime is known to be.

The fiber is used as a filler and binder and renders the material when on the wall coherent, but flexible, and leaves it light in weight.

In the use of so-called "patent plasters" the experience generally has been that while the wall is hard and apparently satisfactory when first applied it loses strength and firmness with age and is likely to become rotten, often very soon, and being heavy when it becomes rotten it is apt to fall off. Such walls also become brittle and crack easily. I claim to have overcome these objections and to have made a plaster which has permanent hardness and adhesiveness when once settled on the wall and is a non-conductor of sound and of heat and of electricity.

What I claim is—

A composition of matter comprising calcined plaster, cement, clay, lime, fiber, and stucco-retarder in the proportions substantially as described.

Witness my hand to the foregoing specification this 19th day of June, 1899.

WILLIAM COALE.

Witnesses:
 MAUD E. LONG,
 JESSIE M. LITTLE.